Dec. 18, 1928.
B. PORTER
1,696,055
GLARELESS HEADLIGHT
Filed Jan. 31, 1927 2 Sheets-Sheet 1
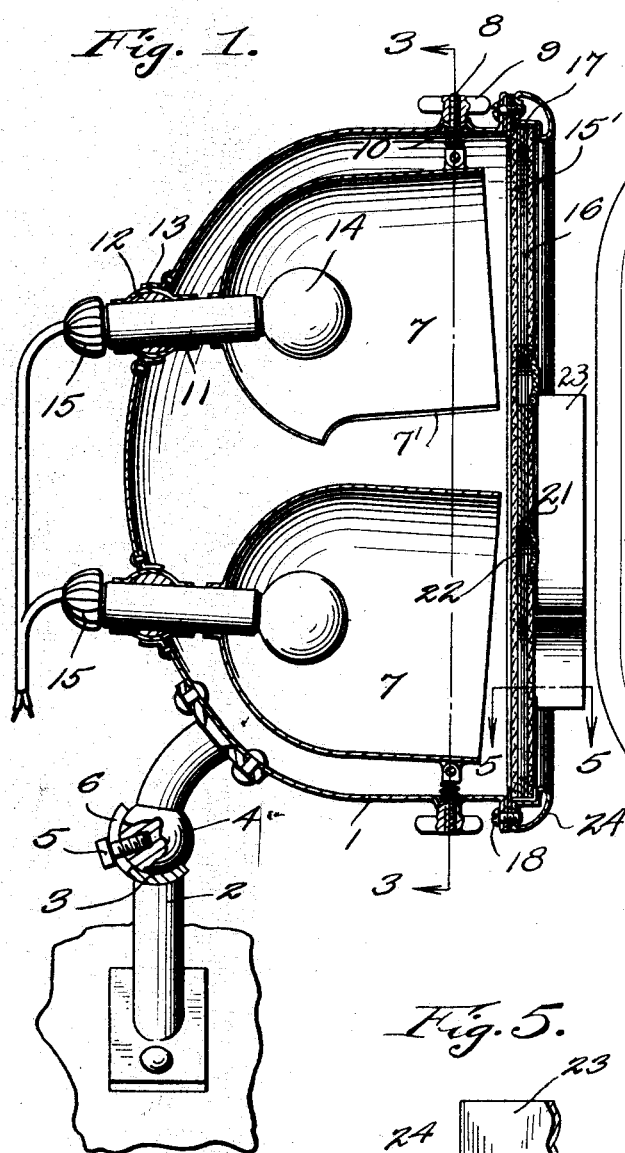
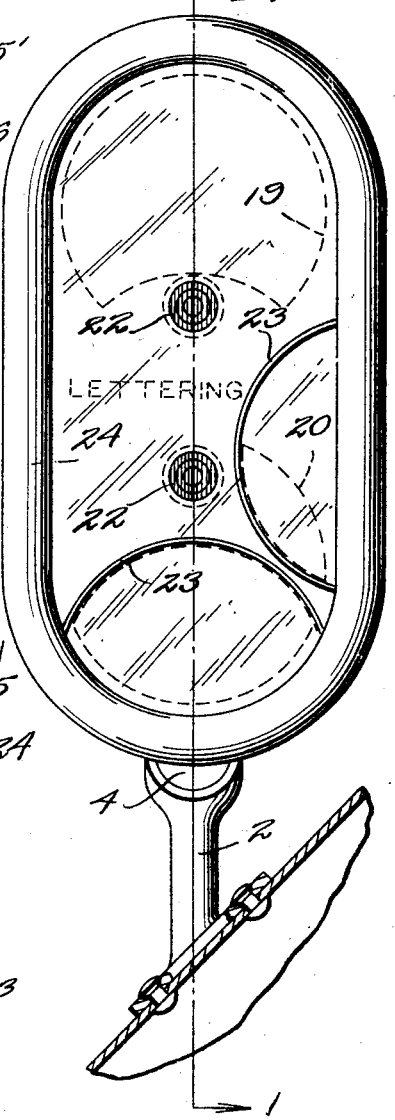
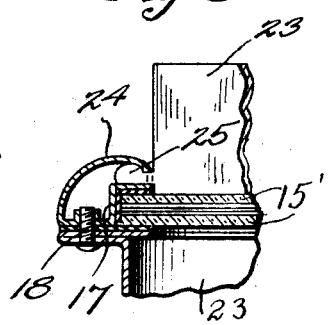
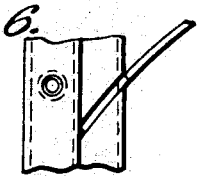
Benjamin Porter
INVENTOR
BY Victor J. Evans
ATTORNEY
WITNESS:

Dec. 18, 1928.  B. PORTER  1,696,055

GLARELESS HEADLIGHT

Filed Jan. 31, 1927   2 Sheets-Sheet 2

Benjamin Porter
INVENTOR

BY Victor J. Evans
ATTORNEY

WITNESS: A. E. Wise.

Patented Dec. 18, 1928.

1,696,055

UNITED STATES PATENT OFFICE.

BENJAMIN PORTER, OF FULLERTON, NORTH DAKOTA.

GLARELESS HEADLIGHT.

Application filed January 31, 1927. Serial No. 164,907.

This invention relates to headlights for motor vehicles and the like, the general object of the invention being to provide means for giving full illumination of the road while preventing blinding of drivers and other persons on the road ahead.

Another object of the invention is to provide means whereby drivers of cars approaching the one carrying the improved headlight, can accurately determine just where the approaching vehicle is located on the road so that there is no danger of one car sideswiping the other.

Another object of the invention is to provide means whereby a sheet of translucent material can be so placed relative to the lens of the lamp that it will act to prevent the rays of light from the lamp from blinding the drivers of other cars and other persons, such sheet having openings therein for permitting the rays of light to pass therethrough and thus illuminate the road where desired, said sheet being adapted to contain advertising matter or the like.

A still further object of the invention is to provide a visor for controlling the direction taken by the rays of light passing through the openings in the translucent sheet.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a section on line 1—1 of Figure 2.

Figure 2 is a front view of the improved lamp, showing a portion of a fender to which it is attached.

Figure 5 is a section on line 5—5 of Figure 1.

Figure 6 is a fragmentary face view of Figure 5.

Figure 4:
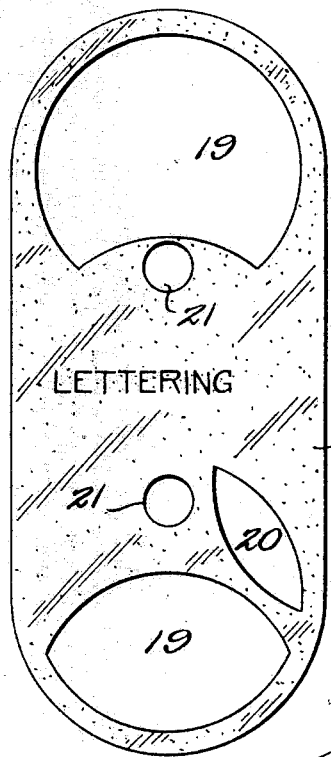
Figure 4 is a view of the translucent sheet.
Figure 3:
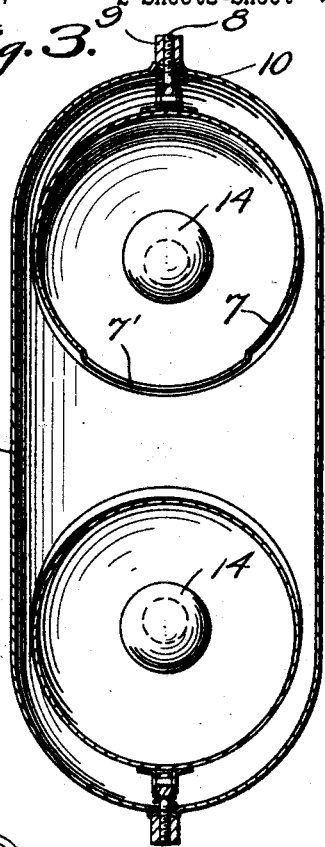
Figure 3 is a section on line 3—3 of Figure 1.

In these views, 1 indicates the casing of the lamp which is supported by the two part standard 2, one part of the standard having a spherical socket 3 therein to receive the ball end 4 of the other part of the standard so that the lamp can be adjusted and the parts are held in adjusted position by the set screw 5 which passes through a slot 6 in the socket 3 and engages a threaded hole in the ball 4. A pair of reflectors 7 is arranged in the lamp, one above the other, and they are adjustably supported in the casing through means of a bolt 8 pivoted to each reflector and passing through a hole in the casing where it is engaged by a nut member 9, a spring 10 being placed between the member and the pivotal point of the bolt. Thus by turning the nut member, the reflector can be moved toward or away from the inner wall of the casing, as will be understood. The socket carrying member 11 for each reflector has a spherical part 12 thereon engaging and opening in the rear of the casing, which has its walls extended by the curved pieces 13 so that the member 11 is tiltably supported in the casing and will thus move with the reflector when the reflector is adjusted by the means before described. A lamp bulb 14 fits in the inner end of each socket carrying member 11 and a plug 15 fits in the outer end thereof.

A pair of transparent plates 15', having one or more sheets 16 of translucent material placed between them, form the lens of the lamp. The two plates, with the sheet or sheets between them, are suitably connected together at their edges by adhesive tape or otherwise and the lens is fastened in the front of the casing in any desired manner, such as by the rim 17 shown in the drawings, which is held in place by the screws 18. The translucent sheet may be formed of paper, tracing cloth or similar material and it has large holes 19 therein which are so arranged relative to the reflectors 7 that the rays of light from these reflectors will pass through the holes. I may also provide a smaller hole 20 in the translucent member through which some of the rays of light may pass to illuminate the side of the road and the sheet is also provided with the small holes 21 which are arranged opposite the lenses 22 carried by the front plate 15' so that some of the rays of light from the lamps will pass through these lenses 22, which are preferably colored red and thus indicate to the drivers of approaching cars the exact position of the vehicle carrying the improved headlamps so that there is no danger of the vehicles sideswiping each other. I prefer to make countersunk holes in the outer plate 15' to receive the lenses 22, as clearly shown in Figure 1.

If desired, visors 23 may be placed at the front of the main glass closure to direct the rays of light passing through the openings in the translucent member to the desired parts of the road, each visor being preferably held in place by the rounded rim 24 and which engages a projection 25 on the base of the visor. This projection fits in a slot formed in the rim 17, as shown in Figures 5 and 6.

It will, of course, be understood that the holes in the translucent member may be arranged in any desired manner and the red lenses can also be arranged in any desired manner and but one of these may be used if desired. The translucent member may also have advertising and other matter printed or otherwise placed thereon so that this matter will be illuminated when the lamps are being used.

Figure 7:
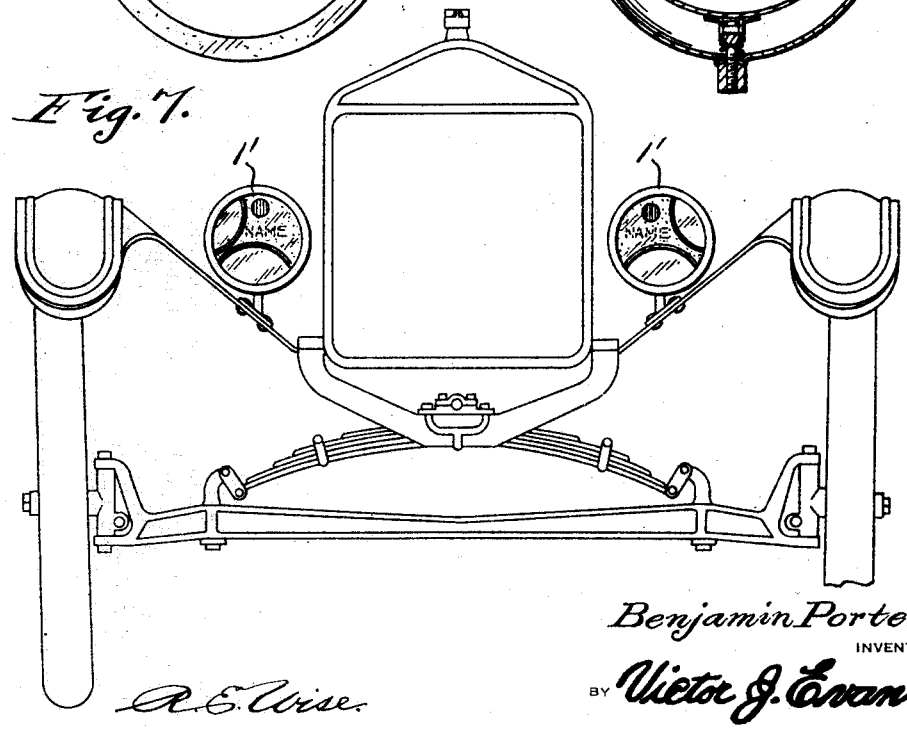
Figure 7 is a front view of an automobile, showing a pair of headlights thereon which are of slightly different form from that shown in the other figures.

Figure 7 shows the lamp 1' of circular formation instead of oblong shape, as shown in the other figures. These lamps have but one red lens.

The upper reflector has its lower portion cut away as shown at 7' so that some of the rays of light can pass through the central portion of the main glass closure or through a red lens placed directly at the center of the main glass closure.

From the foregoing it will be seen that this improved lamp provides means whereby the rays of light can be thrown in any desired direction by adjusting the reflectors and by cutting away certain portions of the translucent member. It will also be seen that the translucent member will dim those rays of light which might blind the drivers of other vehicles, yet giving enough illumination for lighting up the road and enabling the drivers of other vehicles to readily see the full outlines of the improved lamp.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A lamp of the class described comprising a casing, transparent members covering the front of said casing, said members being arranged in pairs lying in spaced relation to each other, translucent means between the transparent members and said translucent means having portions cut away, one of said cut away portions being at the top and one at the bottom of the casing and a third at one side, a pair of reflectors within the casing mounted one above the other and having ball and socket connection with said casing and means adjustably connecting said reflectors to said casing, one of said reflectors being cut away to permit the passage of light to said side opening.

2. A lamp of the class described comprising a casing, a lens at the front of the casing and having a small opening therein, a colored lens fitting in said opening, a sheet of translucent material covering one face of the lens and having a pair of large openings therein and a small opening, the small opening registering with the colored lens, one of the large openings being arranged at the top and the other at the bottom of the sheet and the small opening being arranged intermediate the large openings, a pair of reflectors in the casing, a lamp in each reflector, means for supporting the reflectors so that the rays of light from each lamp will be directed through each large opening, with some of the rays from one lamp passing through the colored lens.

In testimony whereof, I affix my signature.

BENJAMIN PORTER.